US008050975B2

(12) United States Patent
Jetter et al.

(10) Patent No.: US 8,050,975 B2
(45) Date of Patent: Nov. 1, 2011

(54) SYSTEM AND METHOD TO MANAGE SUPPLY CHAIN SETTLEMENT, RISK AND LIQUIDITY

(75) Inventors: William J. Jetter, Piedmont, CA (US); Paul A. Johnson, Torrance, CA (US); Cheryl B. Sill, Tiburon, CA (US); Mark D. Zanzot, Martinez, CA (US); Michael J. Collis, Walnut Creek, CA (US); Sanjay H. Mody, Walnut Creek, CA (US); David G. Corral, Martinez, CA (US); James Keesey, Chino Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 1424 days.

(21) Appl. No.: 10/707,593

(22) Filed: Dec. 23, 2003

(65) Prior Publication Data

US 2005/0075941 A1   Apr. 7, 2005

Related U.S. Application Data

(60) Provisional application No. 60/481,470, filed on Oct. 6, 2003.

(51) Int. Cl.
G06Q 30/00 (2006.01)
G07B 17/00 (2006.01)
G07F 19/00 (2006.01)
(52) U.S. Cl. .......................................... 705/26.1; 705/30
(58) Field of Classification Search .................... 705/26, 705/34
See application file for complete search history.

(56) References Cited

U.S. PATENT DOCUMENTS

| | | | |
|---|---|---|---|
| 5,717,989 A | | 2/1998 | Tozzoli et al. |
| 5,910,987 A * | | 6/1999 | Ginter et al. ..................... 705/52 |
| 6,151,588 A | | 11/2000 | Tozzoli et al. |
| 6,895,388 B1 * | | 5/2005 | Smith ............................ 705/26 |
| 7,006,993 B1 * | | 2/2006 | Cheong et al. ................. 705/38 |
| 7,016,859 B2 * | | 3/2006 | Whitesage ........................ 705/8 |
| 7,069,230 B2 | | 6/2006 | Krystek et al. |
| 7,069,234 B1 * | | 6/2006 | Cornelius et al. ............... 705/26 |
| 7,194,431 B1 * | | 3/2007 | Land et al. ...................... 705/30 |
| 7,212,976 B2 | | 5/2007 | Scheer |
| 7,319,986 B2 * | | 1/2008 | Praisner et al. ................. 705/39 |
| 7,333,942 B1 * | | 2/2008 | Cowles ........................... 705/26 |
| 7,536,336 B1 * | | 5/2009 | Guinan .......................... 705/37 |
| 2002/0143692 A1 * | | 10/2002 | Heimermann et al. ......... 705/37 |
| 2002/0178077 A1 * | | 11/2002 | Katz et al. ....................... 705/26 |
| 2003/0139975 A1 * | | 7/2003 | Perkowski ...................... 705/26 |
| 2003/0208410 A1 * | | 11/2003 | Silverbrook et al. ........... 705/26 |
| 2005/0075941 A1 * | | 4/2005 | Jetter et al. ...................... 705/26 |

OTHER PUBLICATIONS

Setting up a paperless office. (includes price list and directory of document imaging software and hardware) Hunton, James E. Journal of Accountancy, 178, n5, 77(6) Nov. 1994.*
Bank of America Corporation, International Preliminary Report on Patentability, corresponding to International Patent Application No. PCT/US2004/030632, dated Dec. 6, 2007.

* cited by examiner

*Primary Examiner* — Matthew Gart
*Assistant Examiner* — Seye Iwarere
(74) *Attorney, Agent, or Firm* — Michael A. Springs; Moore & Van Allen PLLC; Ryan P. Harris (57) ABSTRACT

A system to manage a supply chain may include a purchase order management module operable on a processor to electronically receive purchase order information from a buyer and to store and track information associated with each purchase order. The system may also include an invoice and trade document management module to electronically store, aggregate and manage invoices and trade documents related to each purchase order and information required for presentment and reconciliation of each purchase order.

55 Claims, 5 Drawing Sheets

SYSTEM AND METHOD TO MANAGE SUPPLY CHAIN SETTLEMENT, RISK AND LIQUIDITY

CROSS REFERENCE To RELATED APPLICATIONS

This application is related to U.S. provisional application No. 60/481,470, filed Oct. 6, 2003, entitled System and Method to Manage Supply Chain Settlement, Risk and Liquidity, naming William J. Jetter, Paul A. Johnson, Cheryl B. Sill, Mark D. Zanzot, Michael J. Collis, Sanjay H. Mody and David G. Corral as inventors. The contents of the provisional application are incorporated here by reference in their entirety, and the benefit of the filing date of the provisional application is hereby claimed for all purposes that are legally served by such claim for the benefit of the filing date.

BACKGROUND OF INVENTION

The present invention relates to supply chain management, and more particularly to a system and method to manage supply chain settlement, risk and liquidity.

Doing business electronically or eBusiness is a common means and possibly a preferred means of doing business for some organizations today. Managing the creation and flow of data between buyers and sellers, settling discrepancies, transferring funds and other operations normally conducted during a transaction can be a challenge, particularly in an electronic or Internet environment. Electronic purchase orders must be created, recorded and tracked. Similarly, corresponding electronic accounts payable instruments must also be created, recorded and tracked. Rules or conditions established by a buyer that a seller must satisfy before payment may also need to be taken into account and tracked to determine if and when satisfied. Electronic invoices, trade documents and the like also need to be created, stored and tracked for satisfaction. Different types of payable instruments may also be used and any system needs to be able to manage any of the different types of instruments. There may also be discrepancies between the payment conditions set by a buyer and discharge information presented by a seller that may need to be resolved.

SUMMARY OF INVENTION

In accordance with an embodiment of the present invention, a system to manage a supply chain may include a purchase order management module operable on a processor to electronically receive purchase order information from a buyer and to store and track information associated with each purchase order. The system may also include an invoice and trade document management module to electronically store, aggregate and manage invoices and trade documents related to each purchase order and information required for presentment and reconciliation of each purchase order.

In accordance with another embodiment of the present invention, a system to manage a supply chain may include a purchase order management module operable on a processor to electronically receive purchase order information from a buyer and to store and track information associated with each purchase order. The system may also include an invoice and trade document management module to electronically store, aggregate and manage invoices and trade documents related to each purchase order and required for presentment and reconciliation of each purchase order. A payment construction module may be provided to create a payable instrument in response to the purchase order information. An agreement management module may warehouse, adjudicate and provide status reporting on payment conditions related to each purchase. A collaboration and workflow module may support and manage workflow between the other modules and between the buyer and a seller.

In accordance with another embodiment of the present invention, a method to manage a supply chain may include creating a payable instrument in an electronic or digital format in response to purchase order information. The method may also include settling the payable instrument in response to adjudicating any payment conditions.

In accordance with another embodiment of the present invention, a method to manage a supply chain may include receiving purchase order information from a buyer electronically or digitally. The method may also include creating an accounts payable instrument in response to receiving the purchase order information. The accounts payable instrument may be created according to rules or conditions established and maintained by the buyer. The method may further include receiving an invoice and trade documents from a seller and adjudication any payment conditions. The method may further include resolving any discrepancies or disputes between a payment condition set by the buyer and discharge information presented by the seller and settling the accounts payable instrument in response to resolving any discrepancies.

In accordance with another embodiment of the present invention, a computer-readable medium having computer-executable instructions for performing a method may include creating a payable instrument in an electronic or digital format in response to purchase order information. The method may also include adjudicating any payment conditions and settling the payable instrument in response to adjudicating any payment conditions.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1:
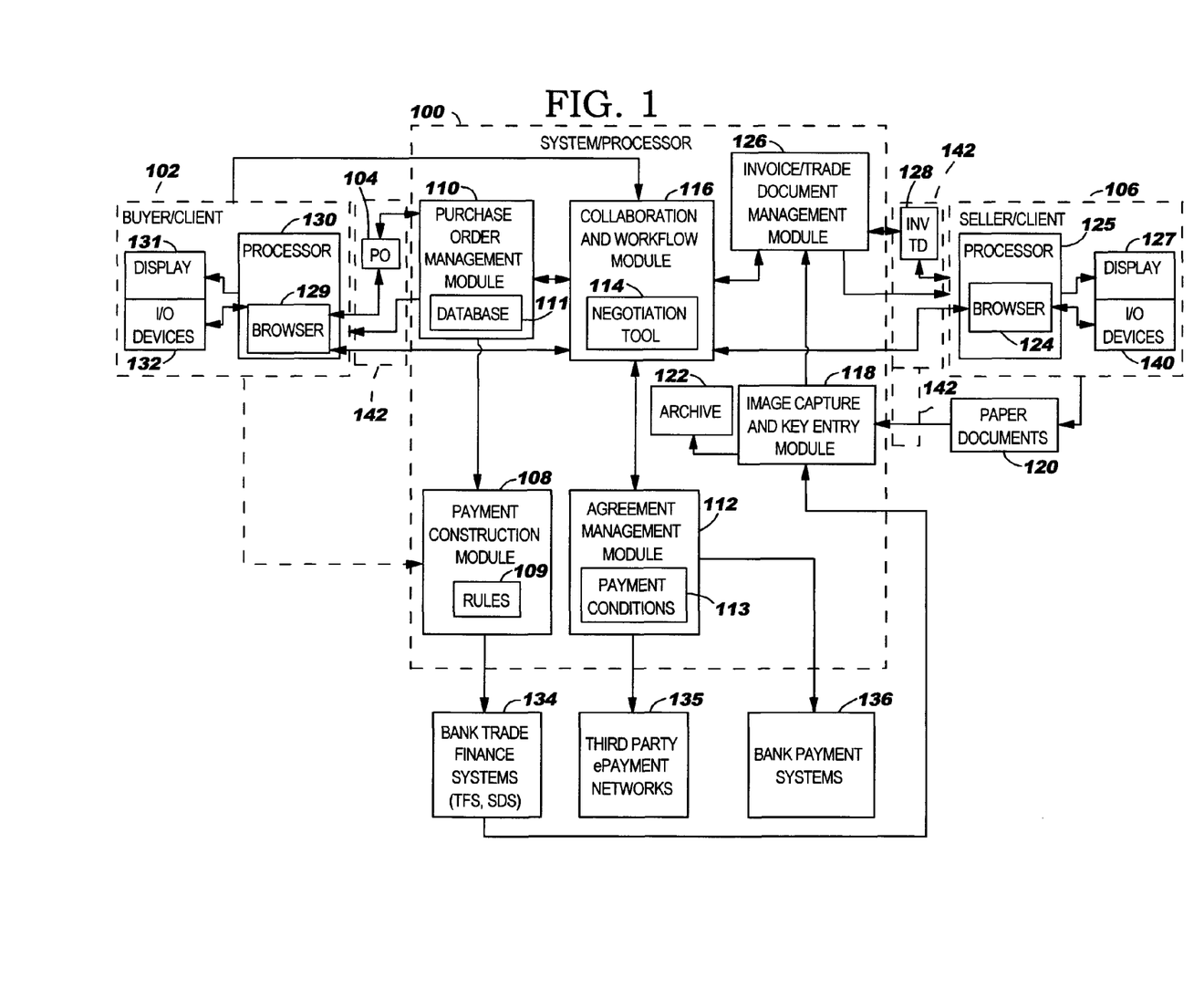
FIG. 1 is a block diagram of a system to manage a supply chain in accordance with an embodiment of the present invention.

FIG. 1 is a block diagram of a system 100 to manage a supply chain in accordance with an embodiment of the present invention. The system 100 and method for managing a supply chain including managing supply chain settlement, risk and liquidity enables a third-party financial service provider, such as a bank or the like, to manage the payables process for a buyer 102 in international and domestic trade. The buyer 102 may use a purchase order 104 to communicate with the service provider or system 100. The system 100 may manage all of the process that starts with the receipt of the purchase order 104 or purchase order information and may end with a payment a seller 106 to settle a payable instrument.

The buyer 102 only needs to send purchase order information 104 to the system 100 and the system 100 may receive invoice information 128 from the seller to match to and close the purchase order 104. The system 100 manages the process associated with the settlement of either international or domestic trade.

The system 100 may support various payables terms like payment under documentary credits and open account to give buyers 102 the flexibility to manage their settlement risk differently for each seller relationship. It has the added benefit of enabling the buyer 102 to attach payment conditions to the open account payable to manage the performance risk of the seller 106 without incurring the credit expense of a documentary credit.

The system 100 may provide data translation and integration technologies that support presentment and receipt of information represented in paper, facsimile, via the Internet or similar means and structure electronic data integration formats. The system 100 does not require all users to conform to a common set of electronic integration technologies. The system 100 uses technologies that capture and translate information from their existing data communication capabilities into a common data structure or predetermined electronic format that may be used by the system 100.

The system 100 may support interactive and on-line collaboration tools to enable buyers 102 and sellers 106 to negotiate and document discrepancies or disputes.

The system 100 may include a payment construction module 108 to create payables in electronic or digital form to be managed by the system 100 on behalf of the Buyer 102. A purchase order management module 110 may record purchase orders 104 in a database 111 within the purchase order management module 110. The purchase order management module 110 may store and keep track of all information associated with each purchase order 104. After recording a purchase order 104, the purchase order management module 110 may send the purchase order information to the payment construction module 108. The payment construction module 108 may sort the purchase orders by criteria predefined by the buyer 102 to create accounts payable instruments. The accounts payable instruments may be managed by the bank on behalf of the buyer 102 up to and including settlement. The system 100 may support the ability to define various payable instruments. Examples of the payable instruments may include, but is not limited to documentary credit instruments used for international trade finance and open account payable instruments used for international or domestic trade. The open account payable instruments may be payable on the seller 106 fulfilling, or discharging, payment conditions set by the buyer 102 before payment will be made to the seller 106. The creation of any payable instrument may be controlled in the system 100 by a set 109 of rules that may be established and maintained by the buyer 102 on the system 100 in payment construction module 108.

In the case of documentary credits, the payment construction module 108 will group purchase orders by seller 106, shipment date or other criteria established by the buyer 102. The seller 106 may be referred to as the exporter in an international trade context. The payment construction module 108 may generate a documentary credit in accordance with the most current Uniform Customs and Practices rules established by the International Chamber of Commerce. The payment construction module 108 may be adapted to transmit information or data to purchase order management module 110 to update the purchase order management module 110 and to indicate which purchase orders 104 may be covered under the documentary credit. The payment construction module 108 may also send the documentary credit information to the bank 134, service provider or issuer that issues the documentary credit. The documentary credit may be sent to the issuing bank 134 in paper or electronic formats. In an alternate embodiment of the present invention, the system 100 has the ability for the issuing bank to use an agreement management module 112 of the system 100 to manage the discharge of documentary credit payment terms in whole or in part.

As previously discussed, for any type of payable instrument, the buyer 102 can establish a set 109 of rules or conditions that must be discharged by the seller 106 before payment may be made to the seller 106. The payables or payment construction module 108 may support any of the following three methods of payment or settlement separately or in combination with any other method:

1. Binary Condition: sets a condition that can be discharged through a True/False response. An example of such a condition is: "Order has been shipped."
2. Qualified Condition: sets a condition that can be compared against a qualified value to determine whether the condition has been discharged. An example of such a condition is: "Order has been shipped before Jun. 19, 2003," where Jun. 19, 2003 is the qualified condition to be discharged.
3. Documentary Condition: sets a condition on the presentment document, whether in paper, facsimile or electronic format, that provides evidence that the condition has been discharged. An example of such as condition is: "Seller presents Bill of Lading for Order to Buyer no later than Jun. 19, 2003." Note that the documentary condition can include a qualified condition, which in this example is the latest shipment date.

In the case when the payment construction module 108 constructs a documentary credit, the payment conditions may be established in accordance with the most current Uniform Customs and Practices rules as established by the International Chamber of Commerce. Additionally, the payment conditions may be set with an expiration date. The expiration date may be the date on which the payment conditions and any associated payment obligation payable on full discharge of the payment condition becomes void if any payment condition has not been fully discharged.

The system 100 may also include an agreement management module 112 to warehouse, adjudicate and provide status reporting on the payment conditions. Payment conditions may be warehoused in a data storage device 113 associated with the agreement management module 112 until all of the payment conditions are fully adjudicated or payment conditions expire due to un-discharged conditions. The agreement management module 112 may adjudicate payment conditions by tracking whether payment conditions have been discharged. Seller discharge information may be passed by a collaboration and workflow module 114 to the agreement management module 112. The agreement management module 112 may compare the seller discharge information to the payment conditions to determine through the use of a programmed system whether the payment conditions have been discharged. The agreement management module 112 can compare conditions and discharge information on an exact match or match made within predefined variances set by the buyer 102. A variance can be established for a qualified or documentary condition. An example of a qualified conditional variance is "Invoice amount can be greater than or less than 3% of the purchase order value." If the adjudication function in the agreement management module 112 discharges all payment conditions, that is, all conditions have been made, the agreement management module 112 may update the status of purchase orders 104 tied to an open account payable indicating that all payment conditions have been discharged. The agreement management module 112 may perform one of the following three processes:

1. If the payable is on documentary credit payment terms, the agreement management module 112 reports the adjudication results to the bank trade finance department or system 134 to use in their documentary credit document negotiation process and closes the payable record.
2. If the payable is on open account payment terms and the buyer 102 has recorded standing instructions for the bank to settle the payable electronically on fully discharged conditions, the bank will settle the payable on behalf of the seller 106 by a process that debits the bank account of the buyer 102 and credits the bank account of the seller 106. The agreement management module 112 then closes the payable record.
3. If the payable is on open account payment terms and the buyer 102 has not recorded standing instructions for the bank to settle the payable electronically on fully discharged conditions, the module closes the payable record.

A feature of the adjudication function of the agreement management module 112 may be to resolve discrepancies between the payment condition set by the buyer 102 and discharge information presented by the seller 106. If the adjudication function cannot reconcile discharge information to a payment condition, it records a discrepancy between the condition and discharge information. For discrepancies, the agreement management module 112 performs one of the following three processes:

1. If the buyer 102 has established predefined payment condition variances, the agreement management module 112 does nothing.
2. If the buyer 102 has not established predefined payment condition variances or the discharge information exceeds the variance amounts, a standing instruction may be set to reject all discrepancies. The agreement management module 112 may report the discrepancy to the buyer 102 and may report to the seller 106 that the discharge information created a discrepancy and has been rejected.
3. If the buyer 102 has not established predefined payment condition variances or the discharge information exceeds the variance amounts, a standing instruction may be set to review all discrepancies. The agreement management module 112 may report to the buyer 102 through the purchase order management module 110 that there are discrepancies. Buyer 102 has the option to resolve the discrepancies interactively using a web browser negotiation tool 114 or the like. The web browser negotiation tool 114 may utilize Internet Relay Chat (IRT) and Simple Mail Transport Protocol (SMTP) or similar technologies. The web browser negotiation tool 114 may be provided through a collaboration and workflow module 116. The web browser negotiation tool 116 may support online, interactive chat or off-line email communication protocols. The web browser negotiation tool 114 may also note the status of any discrepancy on-line during the negotiation process. The buyer 102 and the seller 106 can negotiate to resolve the discrepancy towards the following outcomes:

a. The buyer 102 may accept the seller discharge information and the payment condition may be closed as fully discharged.
b. The buyer 102 may reject the seller discharge information and the payment condition may remain un-discharged. The seller 106 may re-present discharge information or the payment condition may expire in accordance with the expiration date set by the buyer 102.

Figure 2A:
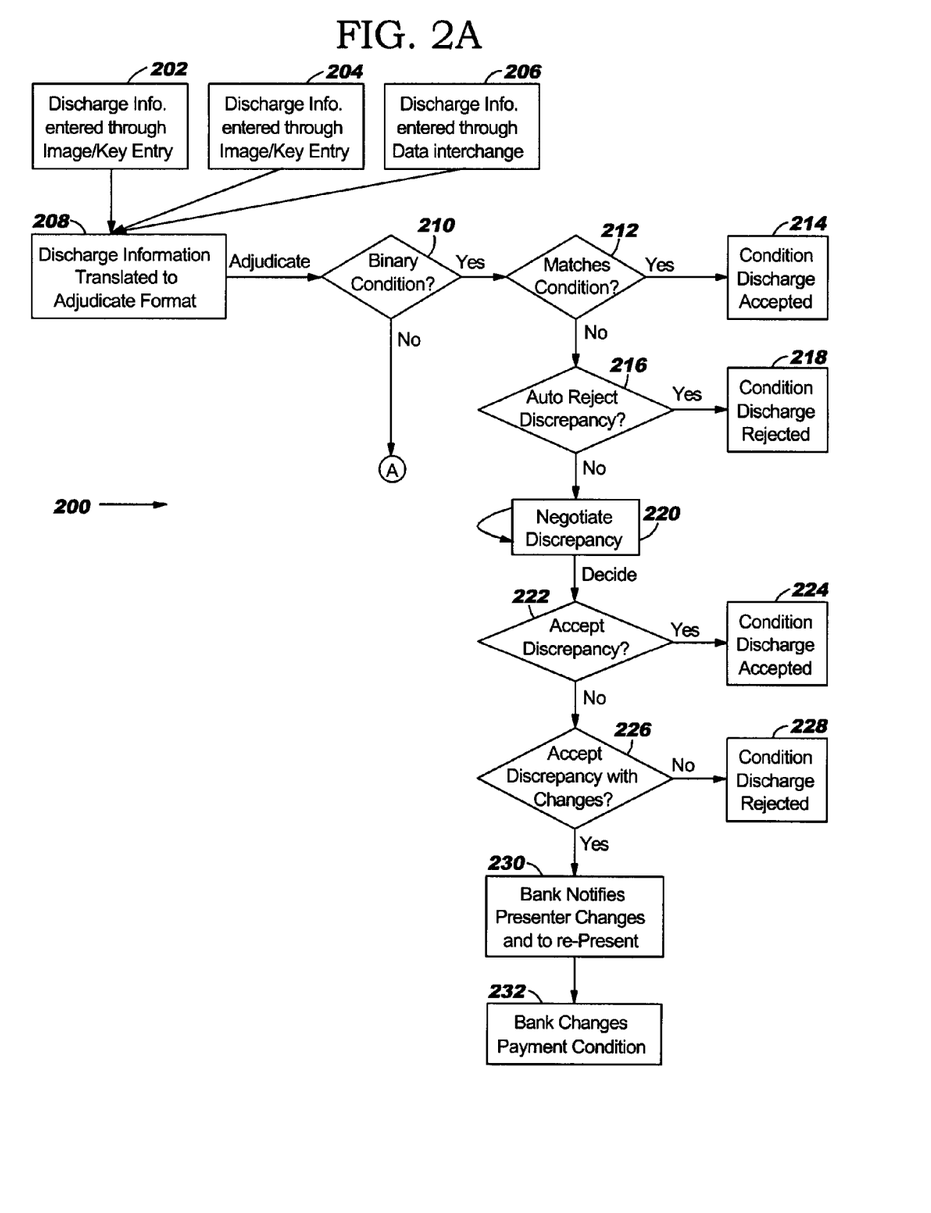
FIGS. 2A, 2B and 2C (collectively FIG. 2) are a flow chart of an example of a method of operation of an Agreement Management module in accordance with an embodiment of the present invention.
Figure 2B:
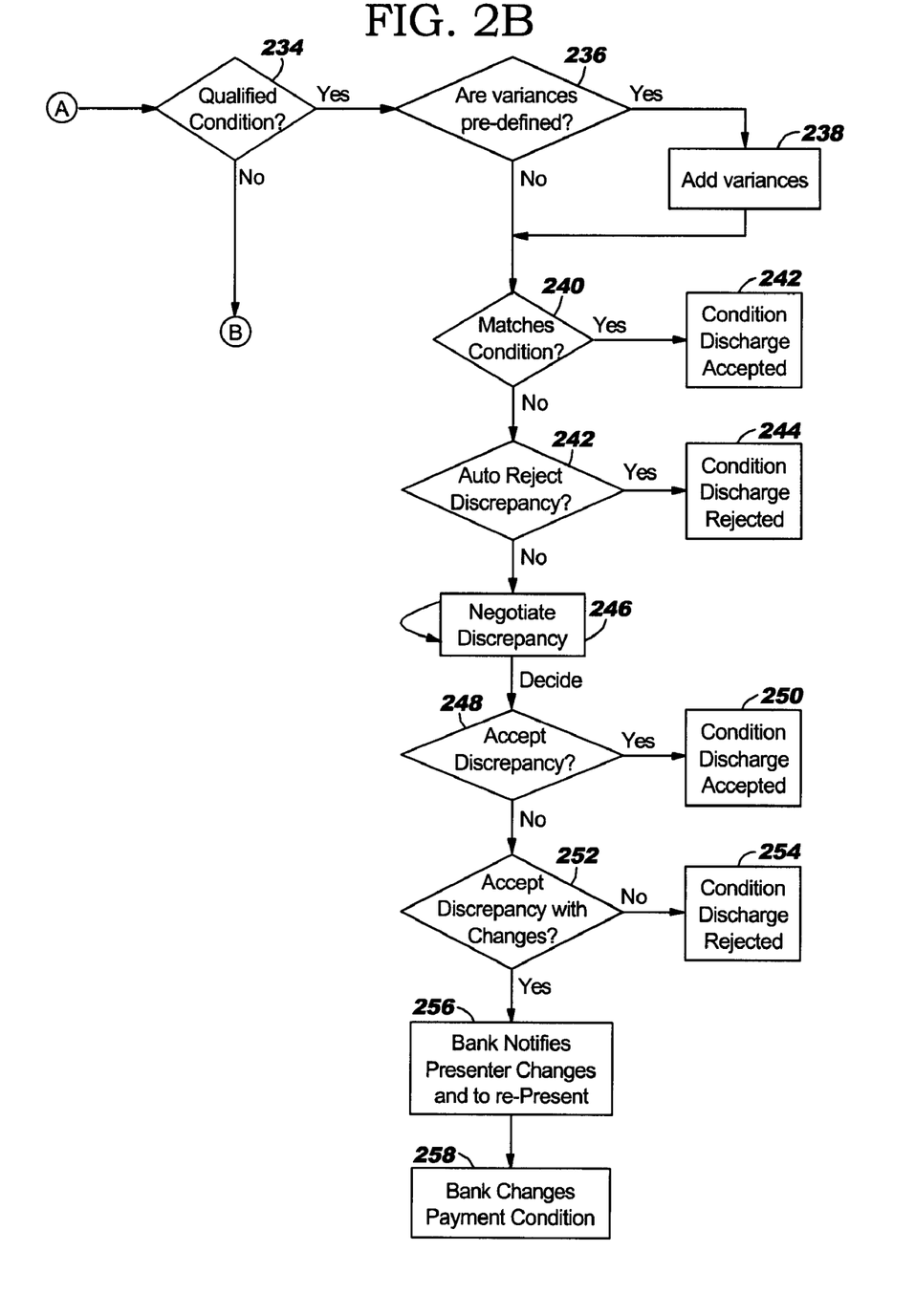
Figure 2C:
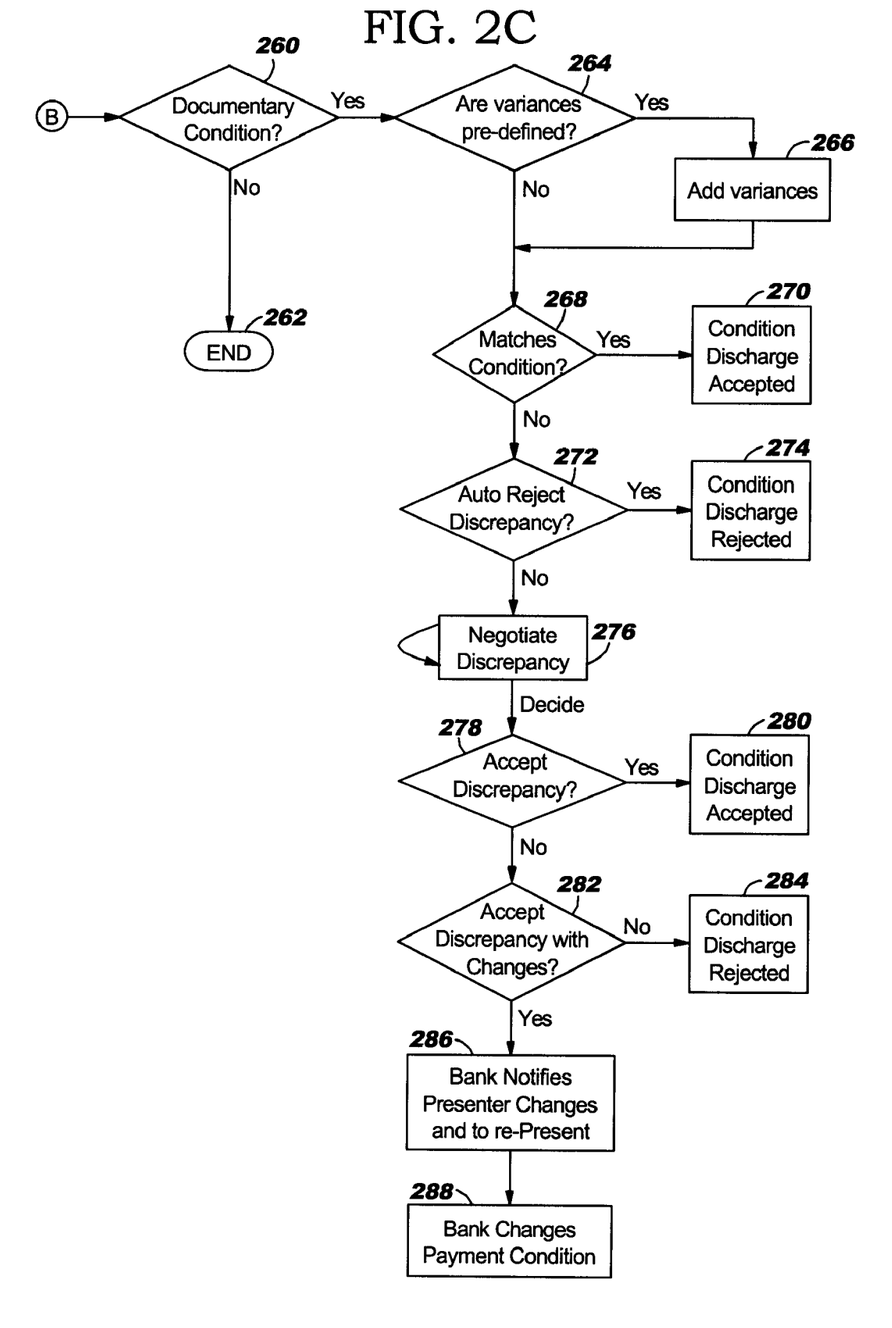

FIGS. 2A, 2B and 2C are a flow chart of an example of a method of operation of the agreement management module 112 in accordance with an embodiment of the present invention to perform an adjudication function. The agreement management module 112 may also provide status reporting on the payment condition. The agreement management module 112 may report the status of outstanding, adjudicated, partially adjudicated, discrepant, closed and expired payment conditions. The status reporting function of the agreement management module 112 can also aggregate reporting of payables and conditional payments process under other systems not managed by the bank. This aggregation feature can report on the status of documentary credits processed by other issuing banks or open account items processed by banks or non-bank service providers, collectively called "e-payments."

The collaboration and workflow module 116 may support functions, such as collaboration, presentation, workflow, authorization and entitlements, digital rights management (DRM) and the like, to manage the workflow of information within the system 100 and between the system 100, buyer 102, seller 106 and third-party trade service providers. The collaboration function of the collaboration and workflow module 116 may support web-based collaboration tools to enable the buyer 102 and seller 106 to negotiate discrepancies, or disputes, arising from the discharging of payment conditions. As previously described, the tool may support Internet Relay Chat (IRC) and Simple Mail Transport Protocols (SMTP) technologies or the like for the buyer 102 and seller 106 to communicate on-line or off-line to resolve any discrepancies.

The presentation function of the collaboration and workflow module 116 may store information on preferred methods for communicating with parties to a transaction processed in the system 100. The system 100 may support paper, web, email, facsimile or portable document format (PDF) and structured document formats that may include standardized electronic data interchange (EDI), extensible markup language (XML) or the like and proprietary standards. Users of the system 100 may define more than one presentation format depending on the information context and stage of processing in the system 100. For example, the buyer 102 may want to send the bank or system 100 information using EDI purchase order formats, negotiate discrepancies with the seller 106 interactively through a web browser and receive status reports through email.

The workflow function or feature of the collaboration and workflow module 116 may route information internally within the system 100 and externally with users or buyers 102 and sellers 106 of the system 106 in accordance with their presentation preferences and processing steps.

The authorization and entitlements functions and features of the collaboration and workflow module 116 may maintain records of persons authorized to use the system 100, their roles in processing workflow and their entitlements to create, modify, delete or view information on the system 100.

The digital rights management (DRM) function or feature of the collaboration and workflow module 116 may manage the rights to and ownership of electronic title documents, where the holder of the document has ownership of a good referenced in the document. A bill of lading is an example of a title document used in international trade. DRM manages which user is the owner, or holder, of the electronic document in the system 100. The DRM function may also support one user transferring holder-ship of electronic documents to another user on or off the system 100.

The system 100 may also include an image capture and key entry module 118. The image capture and key entry module 118 may support users of the system 100, whether they are sellers 106 submitting conditional payment discharge information or internal bank users using the agreement management module 112, that do not present information or documents electronically into the system 100. The image capture and key entry module 118 may support the presentment of non-electronic information and documents, such as paper documents 120 or the like. The image capture and key entry module 118 includes an image capture function or feature wherein paper documents may be scanned by a scanner or the like to create an electronic image of the document. A user of the image capture and key entry module 118 may select a predefined document template that the module 118 may use to locate information on the electronic document image. The image capture and key entry module 118 may then use optical character recognition (OCR) or the like to read information in the document and to covert the information into Unicode encoded data or the like that can be stored and processed by the other modules in the system 100. The electronic document images may be stored in an archive 122, available for retrieval by users of the system 100.

A feature of the image capture and key entry module 118 may permit users to manually enter information into the system 100 using predetermined templates presented to the user using a web browser 124 or the like operating on a processor 125. An input device 140, such as a keyboard or the like, may be used to enter information onto a predetermined template presented to the user or seller 106 on a monitor or display, such as display 127. The module 118 has the ability to force secondary verification and release of the manually entered data through visual inspection or re-entry of key data by another user of the system 100.

In operation, the purchase order management module 110 manages an interface between the buyer 102 and the system 100. The interface may begin with a buyer 102 sending the system 100 purchase order information 104 in a transmission of a structured electronic format or interactively through a web browser, such as browser 129. The browser 129 may operate on a processor 130 associated with the buyer 102. A display 131 and input/output (I/O) devices 132, such as a keyboard, pointing device, voice recognition feature or the like, may be used by the user or buyer 102 to enter and transmit purchase order information and otherwise interact with the system 100. The purchase order management module 110 may warehouse purchase orders 104 received from the buyer 102 and send them to the payment construction module 108. The buyer 102 may obtain all reporting on the status of purchase orders in the system through the purchase order management module 110.

An invoice and trade document management module 126 may manage the interface between the seller 106, and optionally the bank or the like, and the system 100 which may be hosted by a bank or other financial institution. The interface may begin with a seller 106 sending the system 100 invoice and trade document information 128 in a transmission of a structured electronic format or interactively through a web browser, such as browser 124. The invoice and trade document management module 126 may warehouse invoices and trade document orders 128 received from the seller 106 and may send them to the agreement management module 112 for adjudication against payment conditions associated with a payable instrument to the seller 106. The seller 106 may obtain all reporting on the status of purchase orders 104 in the system through the invoice and trade document management module 126.

The invoice and trade document management module 126 may also support a function to create documents that conform to the payment conditions of a payable instrument to the seller 106. The function may be accessed by the web browser 124, that presents the original purchase order(s) 104 and associated payment conditions to the seller 106 with pre-define trade documents that need to be generated to be submitted into the system 100 to discharge the payment conditions. The system 100 may use information from the purchase order(s) 104 to populate data in the trade documents to be generated. The system 100 or invoice and trade document management module 126 may prompt the user or seller 106 to add any required information not populated automatically by the module 126 from data obtain from the purchase order(s) 104. The prompt may be presented to the user or seller 106 on the display 127. The seller 106 may enter the information via the input device 140, such as a keyboard, voice recognition system or the like.

An example of operation of the system 100 including the processing flow of information between modules of the system 100 and between the system 100 and its users (buyers 102, sellers 106 and bank employees) may be described as follows. The buyer 102 may define rules for processing purchase orders 104 and payables or payable instruments on the system 100 that may be sent to, stored and implemented by the payment construction module 108. The buyer 102 may also define document presentment preferences that may be sent to the collaboration and workflow module 116 and implemented by the module 116. The processing rules may cover construction of payables instruments, payment conditions, variances, discrepancy processing and the like.

Buyers 102 may enter purchase order information 104 into the purchase order management module 110 of the system 100 by transmitting purchase order information 104 in standardized, structured data formats. Alternatively, the purchase order information 104 may be interactively entered into the purchase order management module 110 of the system 100 using a web browser interface, such as browser 128. The purchase order management module 110 may send the purchase order information 104 to the payment construction module 108. The payment construction module 108 may create a documentary credit payable instrument in electronic or digital form and may send it to an issuing bank's trade finance system 134 or the like for further processing. Alternatively, the payment construction module 108 may create an open account payable in electronic or digital form with payment conditions and send it to the agreement management module 112. The system 100 may also send payment condition information for the documentary credit to the agreement management module 112 if the bank or financial institution wants to use this to manage the documentary credit payment terms wholly or partially.

The agreement management module 112 may send updated purchase order information to the collaboration and workflow module 116 to route to different elements of the system 100 or to the buyer 102 or seller 106. The collaboration and workflow module 116 may send updated purchase order information to the purchase order management module 110 including information on payables instruments, such as documentary credit instruments or open account payables associated with purchase orders. The agreement management module 112 may send any open account payables and associated payment conditions to the collaboration and workflow module 116 to route to the invoice and trade document management module 126 to present the details to the seller 106.

The documentary credit issuing bank 134 may enter information from paper trade documents into the image capture and key entry module 118 in order to enter conditional payment discharge information into the system 100. Alternatively, the seller 106 may submit paper documents 120 into the image capture and key entry module 118 to image documents and use optical character recognition (OCR) to capture conditional payment discharge information into the system 100. The seller 106 may submit conditional payment discharge information and documents electronically to the invoice/trade management module 126 or use the trade document creation utility of the invoice/trade document Management module 126. The image capture and key entry module 118 may send conditional payment discharge information to the invoice/trade document management module 126 for further routing and processing in the system 100. The invoice/trade document management module 126 may route the conditional payment discharge information to the collaboration and workflow module 116. The collaboration and workflow module 116 may route the conditional payment discharge information to the agreement management module 112. If there are discrepancies between the payment condition and discharge information the agreement management module 112 may route discrepancy information to the collaboration and workflow module 116. The buyer 102 and seller 106 may use the discrepancy negotiation tool 114 in the collaboration and workflow module 116 to resolve any discrepancies.

The results of any third-party e-payment activity from third party ePayment networks 135 or the like, that the buyer 102 desires to aggregate with their purchase order activity may be consolidated and reporting through the agreement management module 112. If there are no discrepancies, the agreement management module 112 may send payment initiation information on behalf of the buyer 102, if so pre-authorized by the buyer 102, to the bank's payment system 136 to settle the payable with the seller 106. The agreement management module 112 may update the purchase order management module 110 with invoice and payment information. The buyer 102 may use the invoice detail to close out open account payable information linked to the purchase order 104.

FIGS. 2A, 2B and 2C (collectively FIG. 2) are a flow chart of an example of a method 200 of operation of the agreement management module 112 in accordance with an embodiment of the present invention. In blocks 202, 204, or 206, discharge information may be entered into the module 112 via the Image capture and key entry module 118 or via data interchange between other modules of the system 100. In block 208 the discharge information may be translated into a format to permit adjudication of the account payable instrument. In block 210, a determination may be made if a predetermined or binary condition has been met. If the condition has been met, the method 200 may advance to block 212 to determine if conditions defined by the buyer 102 have been met. If the condition or conditions defined by the buyer 102 for settlement have been met or matches the conditions in block 212, the condition discharge is accepted in block 214 and payment may be made to the seller 106. If the condition does not match in block 212, the method 200 may advance to block 216. In block 216, a determination may be made if the discrepancy in terms between the buyer 102 and seller 106 is one defined as calling for automatic rejection. If so, the condition discharge may be rejected in block 218. If the condition is not one calling for automatic rejection the discrepancy may be negotiated in block 220. As previously described, the negotiation tool 114 of the collaboration and workflow module 116 may be used by the buyer 102 and seller 106 to resolve the discrepancy. In block 222, a determination may be made if the discrepancy is accepted by the buyer 102 and if so, the obligation may be discharged in block 224. In block 226, a determination may be made if the discrepancy is acceptable with changes. In the discrepancy is not acceptable with changes in block 226, the condition to discharge the obligation may be rejected in block 228. If the discrepancy is acceptable with changes in block 226, the bank may notify the presenter or seller 106 in block 230 of the changes and request the presenter to re-present. The bank may then change the payment conditions in block 232.

If the predetermined binary condition is not met in block 210, the method 200 may advance to block 234. In block 234, a determination may be made if a qualified condition is met. If the qualified condition is met in block 234, the method 200 may advance to block 236. In block 236, a determination may be made if there are any predefined variances. If there are predefined variances, the variances may be added in block 238 to determine if the obligation or invoice can be satisfied based on the variances. If no variances are predefined in block 236 or after adding the variances in block 238, a determination may be made in block 240 if the condition or conditions are matched for settlement. If the condition matches, the condition discharge may be accepted in block 242 and settlement of the obligation or invoice may be made. If the condition is not matched in block 240, a determination may be made in block 242 to automatically reject the discrepancy. If the discrepancy is automatically rejected in block 242, the condition discharge may be rejected in block 244. If the discrepancy is not automatically rejected in block 242, the discrepancy may be negotiated in block 246 using the negotiation tool 114 of the collaboration and workflow module 116. If the discrepancy is accepted in block 248, the condition discharge may be accepted in block 250. If the discrepancy is not accepted in block 248, a determination may be made in block 252 if the discrepancy has been accepted with changes. If not, the condition discharge may be rejected in block 254. If the discrepancy has been accepted with changes, the bank may notify the presenter or seller 106 of the changes in block 256 to amend the presentment and re-present the invoice. The bank may change the payment conditions in block 258. If a qualified condition is determined not to exist in block 234, the method may advance to block 260. In block 260, a determination may be made if a documentary condition exists. If a documentary condition does not exist, the method 200 may end at termination 262. If a documentary condition does exist in block 260, the method 200 may advance to block 264 to determine if any variances have been predefined. The method 200 may then proceed from block 264 to block 288 similar to that previously described in blocks 236-258.

Figure 3:
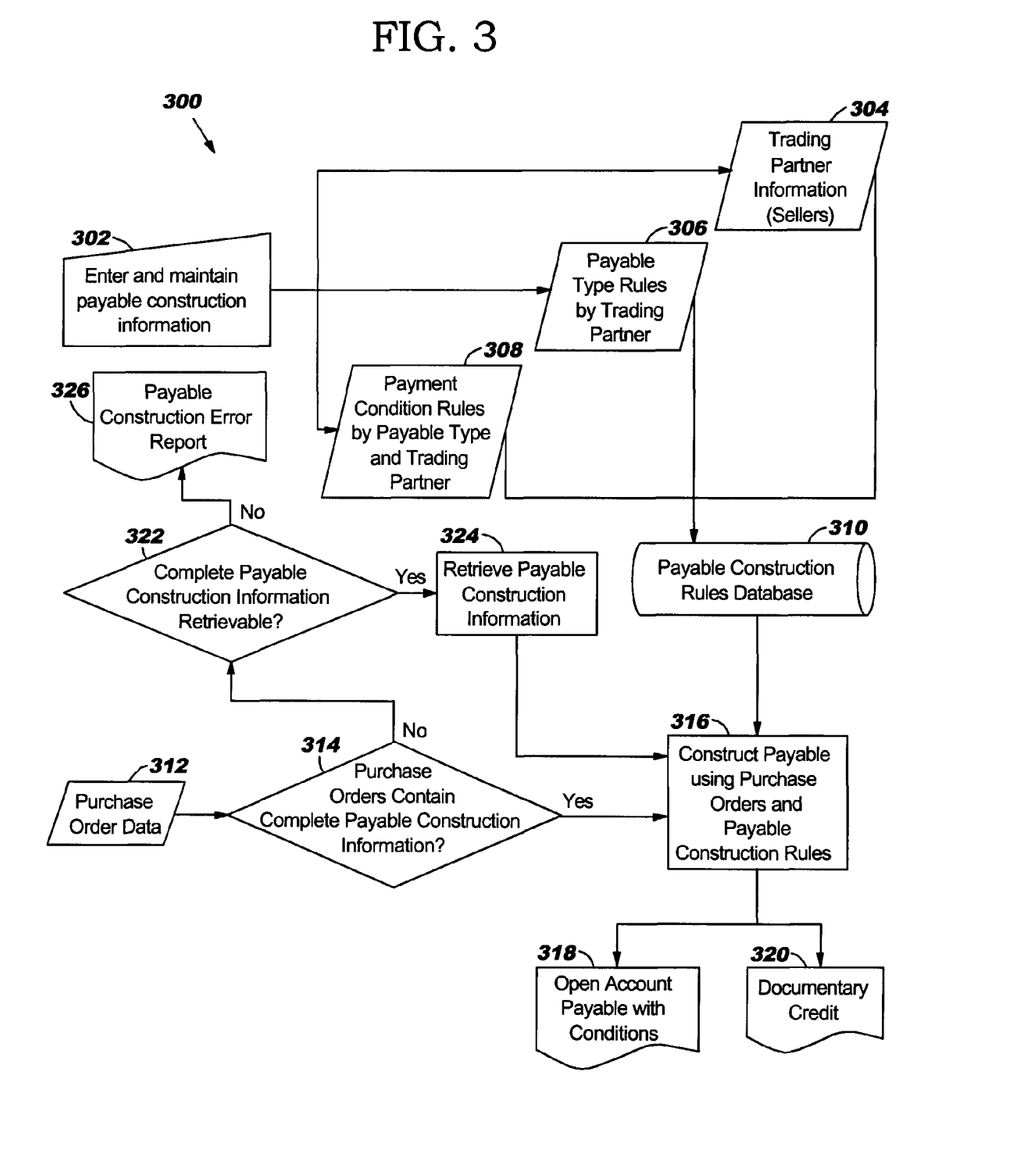
FIG. 3 is a flow chart of an example of a method of operation of a Payment Construction module in accordance with an embodiment of the present invention.

FIG. 3 is a flow chart of an example of a method 300 of operation of the Payment Construction module 108 in accordance with an embodiment of the present invention. In block 302, payable construction information may be entered by a buyer 102 or other user and maintained by the module 108. The payable construction information may include trading partner information (seller information) in block 304, payable type rules by trading partner in block 306, payment condition rules by payable type and trading partner in block 308 and the like. This information and rules may be stored in a payable construction rules database 310. In block 312, purchase order data may be entered by the buyer 102 or other user. In block 314, a determination may be made if the purchase order or orders contain complete payable construction information. If the purchase order or orders contain complete construction information, the method 300 may advance to block 316 and a payable instrument may be constructed using the purchase order information and applying any applicable payable construction rules from the database 310. An open account payable with conditions 318 or a documentary credit instrument 320 may be generated.

If the purchase order or orders do not contain complete payable construction information in block 314, the method 300 may advance to block 322. In block 322, a determination may be made if complete payable construction information may be retrievable by going back to the buyer 102 or from other sources. If complete payable construction information is not retrievable in block 322, a payable construction error report 326 may be generated. The payable construction error report 326 may be presented to the buyer. The buyer may then enter any missing information. If complete payable construction information may be retrieved in block 322, the payable construction information may be retrieved in block 324 from a database, such as the rules database 310 or other data source containing the missing information, or the user may be prompted to enter the missing information. The method 300 may then advance to block 316 where a payable instrument may be constructed using the purchase order information and payable construction rules from the database 310.

The system 100 and modules forming the system 100 may be embodied in one or more data processing devices or the like. Elements of the present invention may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 100 of FIG. 1. Examples of such a medium may be illustrated in FIG. 1 as input devices 132 and 140, communication medium 142 or similar devices. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system to manage a supply chain, comprising:
a purchase order management module operable on a processor to electronically receive purchase orders each purchase order comprising a document received from a buyer to buy at least one of goods or services from a seller, the buyer using the purchase order to communicate with the system so that the system can manage a process that starts with receipt of a purchase order and ends with a payment to the seller to settle a payable instrument, the purchase order management module being managed by a third party entity other than the buyer or seller;
an invoice and trade document management module to receive invoices or trade documents, each invoice is received from the seller and is related to each respective purchase order and required for presentment and reconciliation of each respective purchase order;
an image capture and key entry module to convert non-electronic information into a predetermined electronic format for receipt and use by the invoice and trade document management module;
a database associated with the purchase order management module to store and track information associated with each purchase order; and
a payment construction module to create a payable instrument in response to receiving the purchase orders, wherein the payable instrument comprises an instrument that is payable upon fulfillment of payment conditions, the payment conditions being set by the buyer to be fulfilled prior to the payable instrument being payable.

2. The system of claim 1, wherein the payment construction module sorts approved purchase orders by a predefined criteria.

3. The system of claim 1, further comprising a set of rules to control creation of each payable instrument.

4. The system of claim 3, wherein the payment construction module supports settlement under at least one of a binary condition, a qualified condition and a documentary condition, wherein settlement relates to payment from the buyer upon fulfilling the payment conditions set by the buyer.

5. The system of claim 1, wherein the payable instrument comprises at least one of a documentary credit instrument and an open account payment instrument.

6. The system of claim 1, wherein the payment construction module transmits information to the purchase order management module to indicate which purchase orders are covered under a documentary credit instrument.

7. The system of claim 1, wherein the payment construction module sends documentary credit information to an issuer to issue a documentary credit.

8. The system of claim 1, further comprising an agreement management module to warehouse, adjudicate and provide status reporting on payment conditions related to each purchase order.

9. The system of claim 8, wherein the agreement management module adjudicates payment conditions by tracking whether any payment conditions have been discharged.

10. The system of claim 8, wherein the agreement management module compares seller discharge information to payment conditions to determine whether any the payment conditions have discharged.

11. The system of claim 10, wherein the agreement management module is programmable to discharge payment conditions on at least one of an exact match comparison or predefined variances from an exact match.

12. The system of claim 1, further comprising a collaboration and workflow module to support and manage workflow between the other modules and between the buyer and seller, the collaboration and workflow module comprising a negotiation tool to enable the buyer and seller to negotiate and document discrepancies or disputes between the payment conditions set by the buyer and discharge information presented by the seller.

13. The system of claim 12, wherein the collaboration and workflow module comprises a digital rights management feature to manage rights to and ownership of electronic title documents.

14. The system of claim 1, wherein the invoice and trade document management module receives invoice information from a seller.

15. The system of claim 14, wherein the invoice information is receivable via one of a printed format, facsimile and a communication network.

16. A system to manage a supply chain, comprising:
a purchase order management module operable on a processor to electronically receive purchase orders, each purchase order comprising a document received from a buyer to buy at least one of goods or services from a seller, the buyer using the purchase order to communicate with the system so that the system can manage a process that starts with receipt of a purchase order and ends with a payment to the seller to settle a payable instrument, the purchase order management module being managed by a third party entity other than the buyer or seller;
an invoice and trade document management module to receive invoices or trade documents, each invoice is received from the seller and is related to each respective purchase order and required for presentment and reconciliation of each respective purchase order;
a payment construction module to create a payable instrument in response to the purchase order information; and
an agreement management module to warehouse, adjudicate and provide status reporting on payment conditions related to each purchase order, the payment conditions being set by the buyer to be fulfilled prior to the payable instrument being payable, wherein the agreement management module is programmable to discharge payment conditions on at least one of an exact match comparison or predefined variances from an exact match.

17. The system of claim 16, further comprising a database associated with the purchase order management module to store and track information associated with each purchase order.

18. The system of claim 16, wherein the payment construction module sorts purchase orders by a criteria predefined by the buyer.

19. The system of claim 16, further comprising a set of rules to control creation of each payable instrument.

20. The system of claim 16, wherein the payment construction module supports settlement under at least one of a binary condition, a qualified condition and a documentary condition.

21. The system of claim 16, wherein the payable instrument comprises at least one of a documentary credit instrument and an open account instrument.

22. The system of claim 16, wherein the payment construction module transmits information to the purchase order management module to indicate which purchase orders are covered under a documentary credit instrument.

23. The system of claim 16, wherein the payment construction module sends documentary credit information to a service provider to issue a documentary credit.

24. The system of claim 16, wherein the agreement management module adjudicates payment conditions by tracking whether any payment conditions have been discharged.

25. The system of claim 16, wherein the agreement management module compares seller discharge information to payment conditions to determine if the payment conditions have been discharged.

26. The system of claim 16, further comprising a negotiation tool to enable the buyer and seller to negotiate and document discrepancies or disputes.

27. The system of claim 26, wherein the negotiation tool comprises a browser to negotiate disputes or discrepancies interactively and on-line.

28. The system of claim 16, wherein the collaboration and workflow module comprises a digital rights management feature to manage rights to and ownership of electronic title documents.

29. The system of claim 16, wherein the invoice and trade document management module receives invoice information from a seller.

30. The system of claim 16, further comprising an image capture and key entry module to convert non-electronic information into predetermined electronic format for receipt and use by the invoice and trade document management module.

31. A method to manage a supply chain, comprising:
creating a payable instrument in an electronic format using a computer in response to purchase order information of a purchase order, each purchase order comprising a document received from a buyer to buy at least one of goods or services from a seller, the buyer using the purchase order to communicate with the system so that the system can manage a process that starts with receipt of a purchase order and ends with a payment to the seller to settle a payable instrument, wherein said creating a payable instrument is performed by an entity other than the buyer or seller;
converting any non-electronic information into a predetermined electronic format
adjudicating any payment conditions, the payment conditions being set by the buyer to be fulfilled prior to the payable instrument being payable so that the payable instrument is only payable when the payment conditions are fulfilled; and
settling the payable instrument in response to adjudicating any payment conditions.

32. The method of claim 31, wherein adjudicating any payment conditions comprises at least one of discharging any payment conditions, accepting any payment condition discrepancies or accepting any payment condition discrepancies with changes.

33. The method of claim 31, further comprising electronically storing invoice and trade document information related to each purchase order.

34. The method of claim 31, wherein creating a payable instrument comprises applying a set of predefined rules.

35. The method of claim 31, wherein adjudicating any payment conditions comprises adjudicating any binary condition, qualified condition or documentary condition.

36. The method of claim 31, wherein creating a payable instrument comprises creating one of a documentary credit instrument and an open account instrument.

37. The method of claim 36, further comprising sending documentary credit information to an issuer to issue a documentary credit.

38. The method of claim 31, further comprising reporting status on payment conditions related to each purchase order.

39. The method of claim 31, wherein adjudicating any payment conditions comprises tracking whether any payment conditions have been discharged.

40. The method of claim 31, further comprising comparing seller discharge information to payment conditions to determine whether any payment conditions are dischargable.

41. The method of claim 40, further comprising discharging any payment conditions on at least one of an exact match between seller discharge information and payment conditions or a predefined variance from an exact match.

42. The method of claim 31, further comprising negotiating any discrepancies or disputes.

43. The method of claim 42, wherein negotiating any discrepancies or disputes comprises using a browser.

44. The method of claim 31, managing digital rights to and ownership of electronic title documents.

45. A method to manage a supply chain, comprising:
- receiving one or more purchase orders from a buyer electronically using a computer, each purchase order comprising a document received from a buyer to buy at least one of goods or services from a seller, the buyer using the purchase order to communicate with the system so that the system can manage a process that starts with receipt of a purchase order and ends with a payment to the seller to settle a payable instrument, wherein the purchase order information is received from an entity other than the buyer or seller;
- creating an accounts payable instrument in response to receiving the one or more purchase orders, wherein the accounts payable instrument is created according to rules or conditions established by the buyer;
- receiving one or more invoice or trade documents from a seller, each invoice or trade document is received from the seller and is related to each respective purchase order and required for presentment and reconciliation of each respective purchase order;
- adjudicating any payment conditions;
- comparing seller discharge information to payment conditions to determine whether any payment conditions are dischargable; and
- discharging any payment conditions on at least one of an exact match between seller discharge information and payment conditions or a predefined variance from an exact match.

46. The method of claim 45, wherein adjudicating any payment conditions comprises at least one of discharging any payment conditions, accepting any payment condition discrepancies or accepting any payment condition discrepancies with changes.

47. The method of claim 46, further comprising tracking adjudication of any payment conditions.

48. The method of claim 45, wherein adjudicating any payment conditions comprises adjudicating any binary condition, qualified condition or documentary condition.

49. The method of claim 45, wherein creating a payable instrument comprises creating one of a documentary credit instrument and an open account instrument.

50. A computer-readable medium having computer-executable instructions for performing a method, comprising:
- creating a payable instrument in an electronic format using a computer in response to one or more purchase orders, each purchase order comprising a document received from a buyer to buy at least one of goods or services from a seller, the buyer using the purchase order to communicate with the system so that the system can manage a process that starts with receipt of a purchase order and ends with a payment to the seller to settle a payable instrument;
- adjudicating any payment conditions, the payment conditions being set by the buyer to be fulfilled prior to the payable instrument being payable so that the payable instrument is only payable when the payment conditions are fulfilled;
- settling the payable instrument in response to adjudicating any payment conditions;
- comparing seller discharge information to payment conditions to determine whether any payment conditions are dischargable; and
- discharging any payment conditions on at least one of an exact match between seller discharge information and payment conditions or a predefined variance from an exact match.

51. The computer-readable medium having computer-executable instructions for performing the method of claim 50, wherein adjudicating any payment conditions comprises at least one of discharging any payment conditions, accepting any payment condition discrepancies or accepting any payment condition discrepancies with changes.

52. The computer-readable medium having computer-executable instructions for performing the method of claim 50, wherein creating a payable instrument comprises creating one of a documentary credit instrument and an open account instrument.

53. The computer-readable medium having computer-executable instructions for performing the method of claim 50, wherein adjudicating any payment conditions comprises adjudicating any binary condition, qualified condition or documentary condition.

54. The computer-readable medium having computer-executable instructions for performing the method of claim 50, tracking discharge of any payment instruments.

55. The system of claim 12, wherein the negotiation tool comprises a browser to negotiate disputes or discrepancies interactively and on-line.

* * * * *